United States Patent
Leini

[11] Patent Number: 5,865,699
[45] Date of Patent: Feb. 2, 1999

[54] COATED CHAIN SAW NOSE SPROCKET

[75] Inventor: Arvo Leini, Edsbyn, Sweden

[73] Assignee: Sandvik AB, Sandviken, Sweden

[21] Appl. No.: 729,677

[22] Filed: Oct. 3, 1996

[51] Int. Cl.[6] .............................. F16H 55/06; F16H 7/06; B23D 57/02

[52] U.S. Cl. ........................... 474/161; 474/152; 30/384; 29/527.2; 74/46.8; 427/255.6; 427/282

[58] Field of Search .................................. 474/152, 156, 474/158, 161, 162, 164, 92, 157, 155; 29/527.2, 893; 74/37, 89.21, 665 GE, 467, 468; 427/248.1, 249, 255.6, 255.7, 272, 282

[56] References Cited

U.S. PATENT DOCUMENTS

| | | |
|---|---|---|
| 3,787,607 | 1/1974 | Ehlen et al. . |
| 3,978,976 | 9/1976 | Kamp ..................... 198/617 |
| 4,127,491 | 11/1978 | Reick ..................... 252/16 |
| 4,224,173 | 9/1980 | Reick ..................... 252/52 A |
| 4,378,719 | 4/1983 | Burgess ..................... 83/831 |
| 4,414,085 | 11/1983 | Wickersham et al. . |
| 4,461,269 | 7/1984 | Elliott ..................... 125/21 |
| 4,496,450 | 1/1985 | Hitotsuyanagi et al. . |
| 4,877,505 | 10/1989 | Bergmann . |
| 4,903,410 | 2/1990 | Wieninger et al. ................ 30/387 |
| 4,946,747 | 8/1990 | Bergmann et al. . |
| 4,970,789 | 11/1990 | Bell ..................... 30/384 |
| 4,992,153 | 2/1991 | Bergmann et al. . |
| 5,056,224 | 10/1991 | Seigneur ..................... 30/123.4 |
| 5,249,363 | 10/1993 | Mitrega et al. ................ 30/387 |
| 5,257,568 | 11/1993 | Nitschmann ..................... 83/830 |
| 5,271,157 | 12/1993 | Wienger et al. ................ 30/387 |
| 5,478,634 | 12/1995 | Setoyama et al. . |
| 5,480,462 | 1/1996 | Tuttle ..................... 427/272 |
| 5,523,125 | 6/1996 | Kennedy et al. ................ 427/272 |
| 5,603,311 | 2/1997 | Hoerner et al. ................ 125/21 |

FOREIGN PATENT DOCUMENTS

| | | |
|---|---|---|
| 0 306 612 A1 | 4/1988 | European Pat. Off. . |
| 0 394 661 A1 | 3/1990 | European Pat. Off. . |
| 2543737 | 3/1984 | France . |
| 0830247 | 7/1949 | Germany . |

*Primary Examiner*—Richard M. Lorence
*Assistant Examiner*—Matthew A. Kaness
*Attorney, Agent, or Firm*—Burns Doane Swecker & Mathis, L.L.P.

[57] ABSTRACT

A nose sprocket for chain saws includes an inner peripheral surface defining a bearing race, and teeth disposed at an outer peripheral portion of the nose sprocket. Side surfaces of the nose sprocket are provided with a vapor-deposited low-friction coating, except that the inner peripheral surface and a portion of each side surface adjoining the inner peripheral surface are free of the coating.

6 Claims, 1 Drawing Sheet

COATED CHAIN SAW NOSE SPROCKET

BACKGROUND OF THE INVENTION

The present invention relates to nose sprockets for chain saws, and to a method of making such a nose sprocket.

Thin nose sprockets have long been used to carry a saw chain around the nose of a guide bar. The sprockets carry the chain without friction against the guide bar edges, resulting in less wear and less power requirement.

In vehicle-mounted chain saws the chain is subjected to very high velocity and tensile force. The engine power is much higher than in manual chain saws and the operator has no direct view of the cutting area. If a tree trunk is leaning when sawn through, the saw chain and guide bar may be compressed so hard that the chain of a manual chain saw stops, but the chain of a vehicle-mounted saw may still keep running. This will cause damage by overheating the nose sprocket until it becomes buckled and skewed, followed by local welding and seizure.

Several guide bar and sprocket designs have been suggested to lessen the risk of such damage, such as increasing the space between the sprocket and the guide bar side plates, or pressure-lubricating the sprocket bearing with an excess of lubricant enough to lubricate the sprocket sides. This has at least created a possibility to continue sawing with a slightly deformed sprocket, but has not solved the problem of overheating during the initial compression stage.

SUMMARY OF THE INVENTION

The present invention relates to a nose sprocket having a surface treatment to reduce overheating and to distribute the heat in such a way that the buckling risk is minimal. This is achieved by vapor-depositing a low-friction coating on the opposing side surfaces of the nose sprocket, except that an inner peripheral surface of the nose sprocket (which defines a bearing race during operation) and a portion of each side surface adjoining the inner peripheral surface are free of the coating.

BRIEF DESCRIPTION OF THE DRAWING

The objects and advantages of the invention will become apparent from the following detailed description of a preferred embodiment thereof in connection with the accompanying drawing in which like numerals designate like elements, and in which.

DESCRIPTION OF A PREFERRED EMBODIMENT OF THE INVENTION

Figure 1:
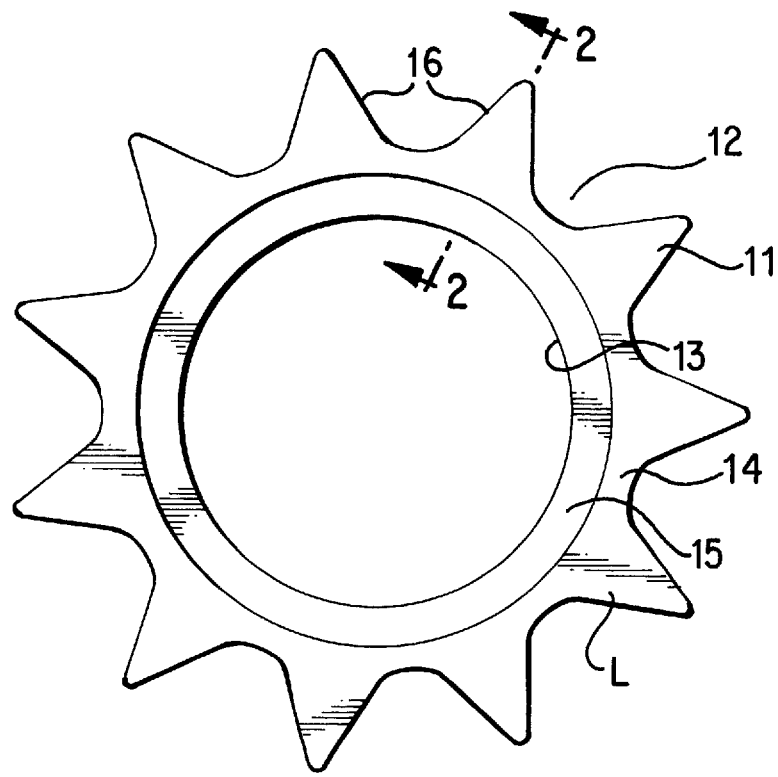
FIG. 1 is a side view of a nose sprocket according to the invention.
Figure 2:
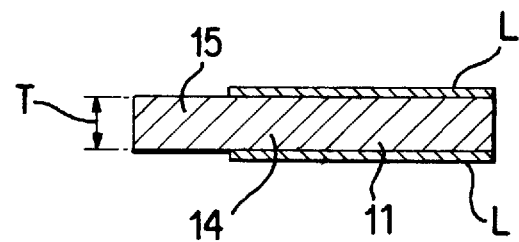
FIG. 2 is a sectional view taken along line 2—2 in FIG. 1.

A side view of a nose sprocket according to the invention is shown in FIG. 1. The sprocket has at its outer periphery, teeth (11) separated by gullets (12). The sprocket center or inner periphery supports a roller bearing, where the inner edge (13) of the sprocket defines an outer race of the bearing.

Between the teeth and the outer race is a sprocket body. The sprocket is made from a metal plate of substantially uniform thickness. The teeth (11) and a radially outer part (14) of the sprocket body are coated with a solid surface layer L of low friction material, while the bearing race (13) and a radially inner part (15) of the sprocket body are left without such coating.

Several suitable types of coating material are known, including graphite, molybdenum sulphide and composites with these materials. One such coating with suitable properties is commercially available under the name of Balinit C, and comprises a multitude of alternating thin sub-layers of tungsten carbide and graphite, each sub-layer being up to 0.1 micron thick, the total inclusive thickness of the sub-layers being up to 5 microns. One method of producing suitable wear-resistant layers consisting of multiple sub-layers is described in EP 394,661, although other methods could of course also be used. This type of layer exhibits greater wear resistance as-well as low friction, but is not suitable for point loads such as occur in roller bearings, and the bearing race (13) must thus be excluded from the coating by being masked when the coating is deposited.

The inner part (15) of the sprocket body should also be excluded from the coating for two reasons. First, any risk of coating flakes entering the bearing must be eliminated. Second, the thickness T of the sprocket should be kept slightly less at the inner part (15) than at the outer part (14) to ensure that there is less friction at the inner part. Since the heat produced by friction will be dissipated through the teeth, a uniform heat production at the inner and outer parts would cause the inner part (15) to be much warmer than the outer part (14), greatly increasing the risk of heat buckling of the sprocket to a conical shape, which, in turn, would make the temperature even less uniform. To counteract this, the coating of the outer part (14) should be at least 1 micron thick on each side of the sprocket.

When the coating is deposited from a vapor phase (CVD or PVD), the masking of the surfaces which should be left uncoated is preferably done with spirally shaped washers, or if a multitude of sprockets is to be coated simultaneously, masking is achieved by supporting a stack of sprockets and washers on a central shaft.

There is no sliding contact between the flanks (16) of the teeth and the saw chain drive links and thus the flanks do not need to be coated. However, to simplify the masking step, the flanks may be coated. This could also reduce wear of the chain.

Although the invention has been described in connection with a preferred embodiment thereof, it will be appreciated by those skilled in the art that additions, modifications and substitutions not specifically described may be made without departing from the spirit and scope of the invention as defined in the appended claims.

What is claimed is:

1. A nose sprocket for chain saws, the nose sprocket having opposing side surfaces defining a substantially uniform thickness therebetween; the nose sprocket including a body and a plurality of teeth projecting from an outer periphery of the body; an inner periphery of the body defining an outer periphery of a bearing race; a vapor-deposited solid low-friction coating disposed on both side surfaces at the teeth and at an outer part of the body adjoining the teeth; the coating being omitted from the inner periphery of the body and both side surfaces at an inner part of the body adjoining the bearing race; the coating including at least one sub-layer of graphite and at least one sub-layer of tungsten carbide.

2. The nose sprocket according to claim 1, wherein there is a plurality of layers of graphite and a plurality of layers of tungsten carbide alternating with the graphite layers.

3. The nose sprocket according to claim 1, wherein the coating on each side surface has a thickness of at least one micron.

4. A method of making a coated nose sprocket for chain saws, comprising the steps of:

a) providing a nose sprocket having opposite side surfaces defining a substantially uniform thickness therebetween; the nose sprocket including a body and a plurality of teeth projecting from an outer periphery of the body; an inner periphery of the body defining an outer periphery of a bearing race;

b) masking the inner periphery and both side surfaces at an inner part of the body adjoining the bearing race; and c) vapor-depositing a low friction coating on unmasked areas of the side surfaces.

5. The method according to claim 4, wherein step B comprises vapor-depositing alternate layers of graphite and tungsten carbide.

6. A method of making a coated nose sprocket for chain saws, comprising the steps of:

a) providing a nose sprocket having opposite side surfaces defining a substantially uniform thickness therebetween; the nose sprocket including a center portion having a central hole and a plurality of teeth projecting from an outer periphery of the center portion;

b) providing a low friction coating material;

c) selectively vapor-depositing the coating material on the side surfaces of the nose sprocket, said selective depositing including coating the side surfaces of the plurality of teeth; and d) leaving an inner periphery of the central hole and the side surfaces of the center portion uncoated.

* * * * *